April 5, 1955   W. D. BROWN ET AL   2,705,655
HOOD LACING
Filed April 4, 1951
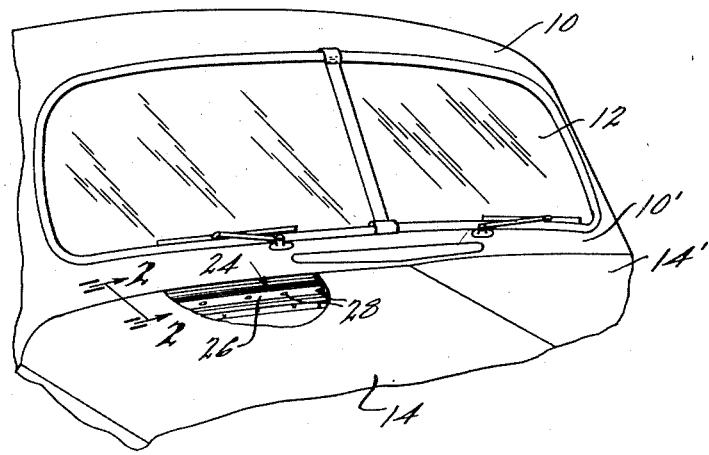
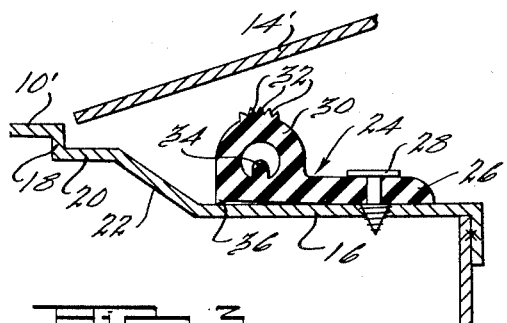
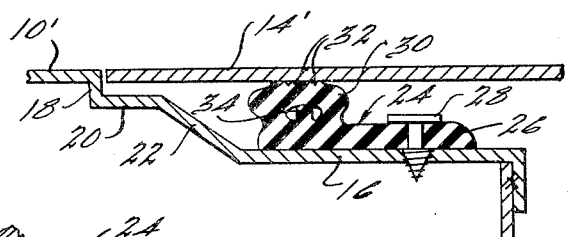
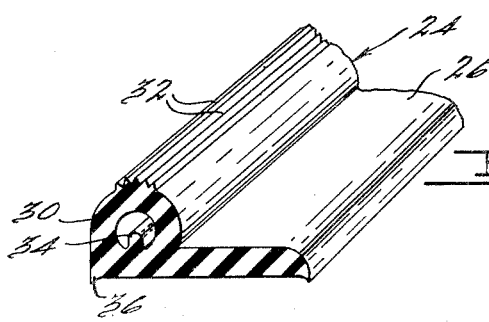
INVENTORS.
Warren D. Brown,
John C. Dudley,
BY Albert E. Flemming
Mark J. Sturtevant,
Harness and Harris
ATTORNEYS.

United States Patent Office 2,705,655
Patented Apr. 5, 1955

2,705,655

HOOD LACING

Warren D. Brown, Detroit, John C. Dudley, Highland Park, Albert E. Flemming, Birmingham, and Mark J. Sturtevant, St. Clair Shores, Mich., assignors to Chrysler Corporation, Highland Park, Mich., a corporation of Delaware Application April 4, 1951, Serial No. 219,254

2 Claims. (Cl. 288—23)

Our invention relates generally to supporting and sealing devices. More particularly our invention relates to a new and novel type of hood lacing adapted to be disposed between a vehicle body and hood.

In the past, structures of this class, generally referred to as hood lacings, have been manufactured of jute and various types of fabrics. These constructions have been found to be generally troublesome due to leakage and the inherent failure to maintain shape.

A principal object of our invention is to provide a new and novel type of hood lacing which will properly support the hood relative to the body as well as maintain a seal therebetween.

Another main object of our invention is to provide a novel type of vehicle hood lacing which will perform its functions properly without any noises which generally accompany lacings of this general type.

Still another object of our invention is to provide our new hood lacing with a reinforcing portion which will prevent complete collapse of the lacing in the event the contour of the hood becomes unduly distorted.

The invention deals generally with a rubber hood lacing which has a tubular portion adapted to be compressed between the vehicle body and hood. The tubular portion is provided, at its outwardly extending surface, with a plurality of longitudinally extending corrugations which engage the underside of the hood in a sealing manner. A lower lateral portion of the lacing is provided with a depending lip or edge which engages the body in a sealing manner. The lacing is also provided with a base portion which is secured to the vehicle body. A ridge is disposed longitudinally within the tubular portion to effect a reinforcement thereof.

Other objects and advantages will become more apparent from the following description of one embodiment of our invention, reference being had to the accompanying drawings in which:

Fig. 1 is a fragmentary perspective view of the hood and body of a motor vehicle having portions cut away to illustrate our invention.

Fig. 2 is a sectional view of our improved structure taken on the line 2—2 of Fig. 1.

Fig. 3 is a sectional view identical with Fig. 2 with the exception that the hood of the vehicle is raised to illustrate the invention.

Fig. 4 is a perspective view of a portion of our novel vehicle hood lacing.

In Fig. 1, we have shown a fragmentary view of a motor vehicle which includes a body 10 having a conventional windshield 12 and a hood 14. The body 10 at a location spaced forwardly of the windshield 12 is provided with a recessed surface 16 which extends transversely of the vehicle. The surface 16 is connected to the exposed part of the body 10 by stepped portions 18, 20 and 22. The surface 16 is covered by the rearwardly extending edge 14' of the hood 14. As shown in Fig. 2, the hood 14 is disposed in an aligned relationship with a horizontal portion 10' of the body 10. This aligned condition is facilitated by the stepped portions 18 and 20 which form a recess into which the aforementioned edge 14' of the hood 14 is disposed. The surface 16 and the hood edge 14' have disposed therebetween a hood lacing generally designated by the numeral 24. The hood lacing 24 extends transversely of the vehicle the entire length of the surface 16 and serves to seal the juncture of the hood edge 14' and the horizontal portion 10' of the body 10 at the locations adjacent the lower edge of the windshield 12.

Our improved hood lacing 24 comprises a generally flat body portion 26 which is secured at spaced locations across the front of the vehicle to the surface 16 by drive screws 28. The base portion 26 is provided with a tubular portion 30 which extends upwardly therefrom. The tubular portion 30 is partially cylindrical or of an inverted U-shaped, cross sectional configuration and is provided with a plurality of corrugations 32 integrally formed in its outer upper surface. The corrugations engage the under side of the hood 14 in a sealing manner and each corrugation provides a line seal between the tubular portion 30 with the hood edge 14'. The tubular portion 30 is also provided with a vertical ridge 34 which extends longitudinally of the hood lacing within the tubular portion 30 and serves to reinforce the tubular portion when it is compressed to a predetermined extent between the hood and the surface 16. The body portion 26 of the lacing is also provided at its trailing lower edge with a depending lip 36, which when compressed against the surface 16, forms a line seal the entire length of the hood lacing 24 and the surface 16.

As shown in Fig. 3, the tubular portion 30 is raised slightly off the surface 16 by the lip 36 when the vehicle hood 14 is raised. When, however, the hood 14 is closed, as shown in Fig. 2, the tubular portion 30 is compressed between the hood edge 14' and surface 16. By this compression the corrugations 32 and the lip 36 form line seals across the body of the vehicle between the lacing 24 and the hood edge 14' and between the lacing 24 and the surface 16, respectively.

The ridge 34 which extends longitudinally of the tubular portion 30, determines the limit of compressibility of the tubular portion. When the tubular portion 30 has been compressed to the extent shown in Fig. 2, the ridge 34 engages the upper inner surface of the tubular portion. The portion 30 may be compressed further due to the inherent resiliency of the lacing but such further compressing is materially retarded by the stiffening action of the ridge 34. The ridge 34 has also been found to be advantageous in limiting the pliability of the tubular portion 30 to insure a proper seal when the vehicle hood and body are not properly fitted.

It will be understood that our improved vehicle hood lacing may be utilized on vehicles of relatively different hood and body dimensions due to the relatively large range of compressibility of the tubular portion 30 compared to other types of hood lacings known in the art. The lacing may be economically produced by an extruding process and it may be used for forming seals between parts of a large number of different structures.

Our improved hood lacing 24 may be made of either natural or synthetic rubber. Butyl and Buna-S synthetic rubbers have been found very satisfactory.

It will be seen that our improved hood lacing will effectively provide a seal across the top of the body at the juncture of the hood and body. Such a seal will prevent the influx of undesirable foreign matter into the engine compartment of the vehicle. It will also be noted that our improved structure may be used to replace conventional hood lacings without changing the body and hood construction.

While we have illustrated and described but one embodiment of our invention, it is to be understood that such is for the purpose of illustration only, and it is contemplated that those skilled in the art may modify certain details without departing from the spirit or scope of the invention as defined in the claims appended hereto.

We claim:

1. As an article of manufacture an elongated strip of rubber for forming a seal between two adjacent substantially planular surfaces comprising a substantially flat base portion, a lip formed integral with said base portion and extending downwardly from one edge thereof and adapted to sealingly engage one of said surfaces, an elongated portion of generally inverted U-shaped cross sectional configuration extending longitudinally of said strip and having the leg sections thereof formed integrally with said base portion at a location on an opposite face of said base portion from said lip, said inverted U- shaped portion extending upwardly from said base portion with the bight portion thereof positioned for engagement with said other surface and forming with said base portion an elongated closed passage, and a reinforcing rib integrally secured to and extending normal to and longitudinally of said base portion said rib extending upwardly into said passage a distance such that it is normally free of engagement with the said bight portion until said bight portion has been partially compressed towards said base portion after which said rib engages said bight portion for rigidifying said U-shaped portion.

2. An article of manufacture as set forth in claim 1 and including a plurality of longitudinally extending ribs on the exterior surface of the bight portion of said inverted U-shaped portion adapted to sealingly engage said other surface upon compression of said inverted U-shaped portion.

References Cited in the file of this patent

UNITED STATES PATENTS

| | | |
|---|---|---|
| 1,594,343 | Austin | Aug. 3, 1926 |
| 1,727,201 | Gilmer | Sept. 3, 1929 |
| 1,928,992 | Clark et al. | Oct. 3, 1933 |
| 2,217,875 | Navert | Oct. 15, 1940 |
| 2,230,303 | Leguillon | Feb. 4, 1941 |
| 2,247,609 | Devilbiss | July 1, 1941 |
| 2,265,693 | Knight | Dec. 9, 1941 |
| 2,379,193 | Shields | June 26, 1945 |
| 2,546,049 | Weaver et al. | Mar. 20, 1951 |
| 2,615,740 | Nathan | Oct. 28, 1952 |
| 2,615,741 | Nathan | Oct. 28, 1952 |